United States Patent
Park et al.

(10) Patent No.: US 11,909,891 B2
(45) Date of Patent: Feb. 20, 2024

(54) RING-LWR-BASED QUANTUM-RESISTANT SIGNATURE METHOD AND SYSTEM THEREOF

(71) Applicants: AGENCY FOR DEFENSE DEVELOPMENT, Daejeon (KR); KOREA UNIVERSITY RESEARCH AND BUSINESS FOUNDATION, Seoul (KR)

(72) Inventors: Jong Hwan Park, Seoul (KR); Kwang Su Lee, Seoul (KR); So Hyun Park, Seoul (KR); Joo Woo, Seoul (KR); Donghwan Lee, Daejeon (KR); Myung Kil Ahn, Daejeon (KR)

(73) Assignees: AGENCY FOR DEFENSE DEVELOPMENT, Daejeon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 17/958,314

(22) Filed: Sep. 30, 2022

(65) Prior Publication Data
US 2023/0034127 A1    Feb. 2, 2023

Related U.S. Application Data

(63) Continuation of application No. PCT/KR2020/013688, filed on Oct. 7, 2020.

(30) Foreign Application Priority Data

Apr. 29, 2020   (KR) .......................... 10-2020-0052902

(51) Int. Cl.
*H04L 9/32* (2006.01)
*H04L 9/08* (2006.01)

(52) U.S. Cl.
CPC .......... *H04L 9/3255* (2013.01); *H04L 9/0852* (2013.01); *H04L 9/0861* (2013.01)

(58) Field of Classification Search
CPC .... H04L 9/1255; H04L 9/0852; H04L 9/0861
See application file for complete search history.

(56) References Cited

U.S. PATENT DOCUMENTS 9,698,986 B1   7/2017   Gutoski et al.
10,778,409 B2  9/2020   Cheon et al.
(Continued)

FOREIGN PATENT DOCUMENTS

KR   10-2012-0071884   7/2012
KR   10-2018-0013064   2/2018
(Continued)

OTHER PUBLICATIONS

"Leo Ducas", "CRYSTALS-Dilithium: A Lattice Based Digital Signature Scheme", vol. 2018, No. 1 pp. 238-268 (Year: 2018).*
(Continued)

*Primary Examiner* — Darshan I Dhruv
(74) *Attorney, Agent, or Firm* — Ladas & Parry, LLP

(57) ABSTRACT

According to an embodiment of the present disclosure, a ring-learning with rounding (LWR)-based quantum-resistant signature method includes: a key generation step of receiving a security parameter, and outputting a signature key and a verification key, via an operation on a ring defined by a cyclotomic equation including three terms; a signature value output step of outputting a signature value based on the output signature key; and a signature verification step of calculating an operation value based on the output verification key and signature value, and verifying a signature based on a result of comparing the output signature value with the calculated operation value.

7 Claims, 3 Drawing Sheets

(56) References Cited

U.S. PATENT DOCUMENTS

| | | | | |
|---|---|---|---|---|
| 2009/0235078 A1* | 9/2009 | Futa | ...................... | H04L 9/3255 |
| | | | | 713/176 |
| 2012/0159179 A1* | 6/2012 | Lauter | ................... | H04L 9/3247 |
| | | | | 380/44 |
| 2012/0166808 A1* | 6/2012 | Hong | .................... | H04L 9/3093 |
| | | | | 713/180 |
| 2014/0177828 A1* | 6/2014 | Loftus | ................... | H04L 9/0852 |
| | | | | 380/44 |
| 2020/0322147 A1 | 10/2020 | Lee et al. | | |
| 2021/0211303 A1* | 7/2021 | Hiromasa | ............. | H04L 9/0643 |

FOREIGN PATENT DOCUMENTS

| | | | | |
|---|---|---|---|---|
| KR | 10-2018-0135779 | | 12/2018 | |
| KR | 10-2027508 | | 10/2019 | |
| KR | 10-2040106 | | 11/2019 | |
| WO | WO-0209348 A2 * | 1/2002 | ........... | H04L 9/3093 |
| WO | WO-2018177905 A1 * | 10/2018 | | |

OTHER PUBLICATIONS

"Yang Wang", "CRPSF and NTRU Signatures over cyclotomic fields", pp. 1-42 (Year: 2017).*

"Ducas et al.". "Crystals-Dilithium: A Lattice-Based Digital Signature Scheme" (Year: 2018).*

"Wang et al.", "CRPSF and NTRU Signatures over cyclotomic fields" (Year: 2017).*

Notice of Allowance dated Jul. 27, 2022 for Korean Patent Application No. 10-2020- 0052902 and its English translation provided by Applicant's foreign counsel.

Office Action dated Apr. 25, 2022 for Korean Patent Application No. 10-2020-0052902 and its English translation provided by Applicant's foreign counsel.

Ye Yuan: "Efficient Implementation and Performance Evaluation of Lattice-based Cryptography over Memory-Constrained Environment", Kyushu University, https://doi.org/10.15017/4060003, Mar. 23, 2020, pp. 1-90.

Vadim Lyubashevsky et al.: "NTTRU: Truly Fast NTRU Using NTT", Cryptology ePrint Archive 2019, pp. 1-22.

Nevine Ebeid et al.: "A New CRT-RSA Algorithm Resistant to Powerful Fault Attacks", Proceedings of the 5th Workshop on Embedded Systems Security, 2010, pp. 1-8.

Gerold Grunauer: "Proposal of a New Efficient Public Key System for Encryption and Digital Signatures", Cryptology ePrint Archive, 2007, pp. 1-19.

International Search Report for PCT/KR2020/013688 dated Jan. 22, 2021 and its English translation from WIPO (now published as WO 2021/221243).

Written Opinion of the International Searching Authority for PCT/KR2020/013688 dated Jan. 22, 2021 and its English translation by Google Translate (now published as WO 2021/221243).

Lee, Joohee et al. RLizard: Post-Quantum Key Encapsulation Mechanism for IoT Devices. In: IEEE Access. Dec. 3, 2018, pp. 2080-2091.

Choi, Piljoo et al. Fast and Power-Analysis Resistant Ring Lizard Crypto-Processor Based on the Sparse Ternary Property. In: IEEE Access. Jul. 16, 2019, pp. 98684-998693.

An, Hyeongcheol et al. QChain: Quantum-resistant and Decentralized PKI using Blockchain. In: 2018 Symposium on Cryptography and Information Security. Jan. 23, 2018, pp. 1-8.

* cited by examiner

RING-LWR-BASED QUANTUM-RESISTANT SIGNATURE METHOD AND SYSTEM THEREOF

TECHNICAL FIELD

The present disclosure relates to a ring-learning with rounding (LWR)-based quantum-resistant signature method and a system thereof, and more particularly, to a ring-LWR quantum-resistant signature method and system for improving a ring-learning with errors (LWE)-based quantum-resistant signature method that has been used previously.

BACKGROUND ART

As software advances, because the unique value of general-purpose software used by anyone increases day by day but the risk of software being copied, forged, and used continues to increase, software producers use various signature or encryption (modulation) methods to prevent forgery and piracy of software products.

Unless software is updated in a short period of time and thus the authenticity of a product may be determined at every update cycle may be determined, because there is no real performance difference between copied software and genuine software, the demand for signature or encryption methods with enhanced security in the software field is increasing day by day. Signature or encryption methods may be generated based on mathematical techniques, and the most widely used method is a Rivest-Shamir-Adleman (RSA) method.

However, because an RSA method may be broken in a short time by a quantum computer when the quantum computer currently being studied is put to practical use, a signature or encryption method that is difficult to be broken even by a computational system of a quantum computer is being actively studied. Such a signature or encryption method is called a quantum-resistant signature or quantum-resistant encryption (modulation) method.

A known method among quantum-resistant signature methods is a public key encryption and signature method based on ring-learning with errors (LWE). In more detail, in a ring-LWE-based quantum-resistant signature method, m, n, and q are positive integers, and a cyclotomic ring R has the form of $R=Z[X]/\{\Phi_m(X)\}$, based on a polynomial $Z[X]$ having an integer as a coefficient with a modulus of a cyclotomic polynomial $\Phi_m(X)$. $R_q$ is a cyclotomic ring having the form of $R_q=Z[X]/\{\Phi_m(X)\}$, and assuming that $D_s$ and $D_e$ are arbitrary distributions in $R_q$, $b=a*s+e$ is calculated for randomly selected polynomials $a \in R_q$, $s \in D_s$, and $e \in D_e$.

In this case, when (a,b) is given, finding s is defined as a ring-LWE-based method, and $D_s$ refers to $R_q$ and $D_e$ refers to a Gaussian distribution $GD_\sigma$, with a standard deviation of sigma. An LWE problem defined in $Z_q$ was first introduced by Regev in 2005 and also an LWE-based public key encryption method was first proposed by Regev, and then a ring-LWE problem defined in a ring was proposed by Lyubashevsky in 2010.

One of the problems of a ring-LWE-based method is that it is difficult to find s when (a, b) is given. A ring-LWE method-based quantum-resistant signature method uses a protocol that proves in zero knowledge that a signature key s held by an authorized user is known, based on a ring-LWE method. A verification key is designed in a ring-LWE structure so that an unauthorized user with no signature key may not obtain a signature key from the verification key and may not generate an arbitrary signature. As a representative method of a ring-LWE-based quantum-resistant signature method, there is a method introduced in 2014 by Bai and Galbraith, and the following procedure is followed.

First, as a procedure of generating a key, a security parameter $1^\lambda$ is received and a verification key and a signature key are output. Next, the signature key and a message M are received and a signature value is output. Finally, the verification key, the message M, and the signature value are received, and a signature is verified.

In a ring-LWE-based quantum-resistant signature method as described above, a cyclotomic equation $\Phi_m(X)$ is used as $x^n+1$. A ring generated in the equation has the advantages of efficient operation and a low error propagation rate in a multiplication operation. In this case, an error propagation rate is defined as, during multiplication of two polynomials that are elements of a polynomial ring, an operation on a sum of products of $a_j$, and $b_k$ included in each of coefficients $c_i$ constituting $c(x)=a(x)*b(x)=c_0+c_1X+ \ldots c_{n-1}X^{n-1}$.

In order for a signature structure to be secure in the ring as above, an integer n should be a power of 2. Also, in order to increase security strength, an index n of a cyclotomic equation should be increased. But when n is doubled, overall system parameter values including a signature value are increased inefficiently. Also, because the signature structure designed based on LWE needs to extract errors in a Gaussian distribution in a key generation process, a time required for the key generation process may be too long and there may be vulnerability to a side-channel attack.

However, assuming that an LWE-based quantum-resistant signature method is used, when a cyclotomic equation is selected as $x^n+1$, because an error propagation rate is n, a low error propagation rate is achieved, but because the index n should be a power of 2, system parameters are inefficiently increased. When a cyclotomic equation is selected as $x^n+x^{n-1}+x^{n-2}\ldots +1$, a degree of freedom in selecting an index is increased, but an error propagation rate is higher than that when a cyclotomic equation is selected as $x^n+1$.

After all, according to an LWE-based quantum-resistant signature method, no matter how a cyclotomic equation is adopted, there are different limitations, and thus, a new quantum-resistant signature method which may overcome both limitations is required.

DESCRIPTION OF EMBODIMENTS

Technical Problem

A technical problem to be solved by the present disclosure is to provide a ring-learning with rounding (LWR)-based quantum-resistant signature method that may efficiently use system parameter values while having a lower error propagation rate than that of a conventional ring-learning with errors (LWE)-based quantum-resistant signature method.

Solution to Problem

According to an embodiment of the present disclosure, a ring-learning with rounding (LWR)-based quantum-resistant signature method includes: a key generation step of receiving a security parameter, and outputting a signature key and a verification key, via an operation on a ring defined by a cyclotomic equation including three terms; a signature value output step of outputting a signature value based on the output signature key; and a signature verification step of calculating an operation value based on the output verification key and signature value, and verifying a signature based on a result of comparing the output signature value with the calculated operation value.

According to another embodiment of the present disclosure, a ring-learning with rounding (LWR)-based quantum-resistant signature system includes: a key generation unit configured to receive a security parameter, and output a signature key and a verification key, via an operation on a ring defined by a cyclotomic equation including three terms; a signature value output unit configured to output a signature value based on the output signature key; and a signature verification unit configured to calculate an operation value based on the output verification key and signature value, and verify a signature based on a result of comparing the output signature value with the calculated operation value.

According to an embodiment of the present disclosure, a computer-readable recording medium stores a program for executing the ring-LWR-based quantum-resistant signature method.

Advantageous Effects of Disclosure

According to the present disclosure, system parameters including a signature value may be efficiently set for various security strengths.

Also, according to the present disclosure, because a specific function for reducing an error propagation rate in a polynomial multiplication operation defined in a ring is adopted, entire system efficiency including an algorithm implementation speed is significantly improved.

Also, according to the present disclosure, because a process of generating a secret key in a Gaussian distribution may be omitted in a key generation process, a key generation speed may be increased and the risk of a side-channel attack may be reduced.

BEST MODE

Figure 1:
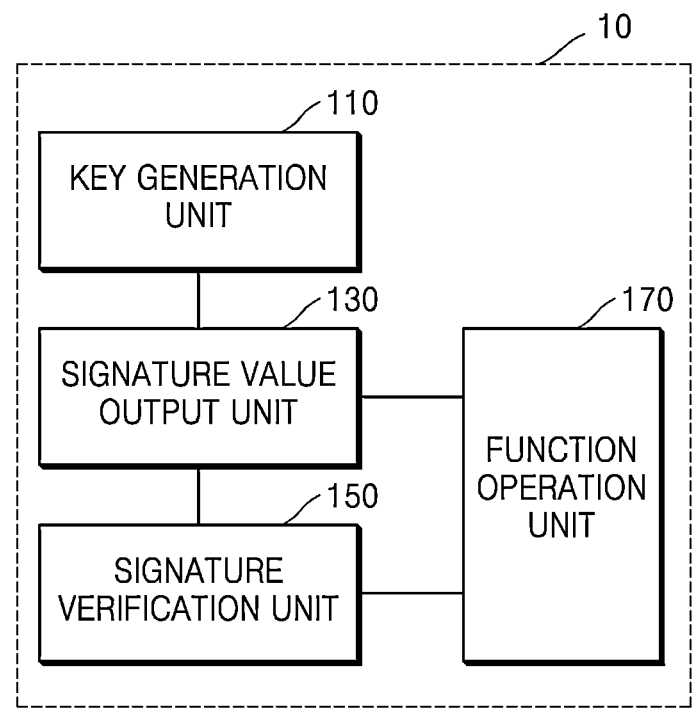
FIG. 1 is a block diagram illustrating a quantum-resistant signature system, according to an embodiment of the present disclosure.

According to an embodiment of the present disclosure, a ring-learning with rounding (LWR)-based quantum-resistant signature method includes: a key generation step of receiving a security parameter, and outputting a signature key and a verification key, via an operation on a ring defined by a cyclotomic equation including three terms; a signature value output step of outputting a signature value based on the output signature key; and a signature verification step of calculating an operation value based on the output verification key and signature value, and verifying a signature based on a result of comparing the output signature value with the calculated operation value.

A degree n of a leading term of the cyclotomic equation may be a product of a power of 2 and a power of 3.

The signature value output step may include outputting the signature value, by applying a truncate function of selectively extracting only coefficients of terms selected under a preset condition.

The signature verification step may include calculating the operation value, by applying a truncate function of selectively extracting only coefficients of terms selected under a preset condition.

According to another embodiment of the present disclosure, a ring-learning with rounding (LWR)-based quantum-resistant signature system includes: a key generation unit configured to receive a security parameter, and output a signature key and a verification key, via an operation on a ring defined by a cyclotomic equation including three terms; a signature value output unit configured to output a signature value based on the output signature key; and a signature verification unit configured to calculate an operation value based on the output verification key and signature value, and verify a signature based on a result of comparing the output signature value with the calculated operation value.

A degree n of a leading term of the cyclotomic equation may be a product of a power of 2 and a power of 3.

The ring-LWR-based quantum-resistant signature system may further include a function operation unit configured to implement a truncate function of selectively extracting only coefficients of terms selected under a preset condition, wherein the signature value output unit is further configured to output the signature value, by applying the truncate function.

The ring-LWR-based quantum-resistant signature system may further include a function operation unit configured to implement a truncate function of selectively extracting only coefficients of terms selected under a preset condition, wherein the signature verification unit is further configured to calculate the operation value, by applying the truncate function.

According to an embodiment of the present disclosure, a computer-readable recording medium stores a program for executing the ring-LWR-based quantum-resistant signature method

MODE OF DISCLOSURE

As the present disclosure allows for various changes and numerous embodiments, certain embodiments will be illustrated in the drawings and described in the detailed description. Effects and features of the present disclosure, and methods for achieving them will be clarified with reference to embodiments described below in detail with reference to the drawings. However, the present disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that the terms "including," "having," and "including" are intended to indicate the existence of the features or elements described in the specification, and are not intended to preclude the possibility that one or more other features or elements may exist or may be added.

When a certain embodiment may be implemented differently, a specific process order may be different from the described order. For example, two consecutively described processes may be performed substantially at the same time or may be performed in an order opposite to the described order.

For convenience of explanation, in the present specification, notations such as Equations 1 through 3 are always interpreted in the same manner.

$$S1, S2 \in R \quad [\text{Equation 1}]$$

$$\mathrm{mod}(z) \quad [\text{Equation 2}]$$

$$[\cdot] \quad [\text{Equation 3}]$$

Equation 1 indicates that s1 and s2 are elements belonging to a set R.

Equation 2 means that modular arithmetic is performed with an element z.

Equation 3 means that a value in parentheses is rounded.

FIG. 1 is a block diagram illustrating a quantum-resistant signature system, according to an embodiment of the present disclosure.

Referring to FIG. 1, a quantum-resistant signature system 10 according to the present disclosure includes a key generation unit 110, a signature value output unit 130, a signature verification unit 150, and a function operation unit 170.

The quantum-resistant signature system 10 according to the present disclosure may implement a ring-learning with rounding (LWR)-based quantum-resistant signature method for improving a known ring-learning with errors (LWE)-based quantum-resistant signature method. Here, ring-learning with rounding (LWR) is defined as a problem of finding s when $(a,b=[a*s]_p)$ is given by using a rounding function $[\cdot]_p: Z_q \to Z_p$, instead of ring-LWE that essentially includes a process of adding a small error e to an a*s operation value, and because a process of extracting an error in a Gaussian distribution is omitted, a key generation time may be reduced and a size of a public key may be reduced from $Z_q$ to $Z_p$.

The key generation unit 110 receives a security parameter as an input, and outputs a signature key and a verification key via an operation on a ring defined by a cyclotomic equation including three terms.

The security parameter received as an input value by the key generation unit 110 is $1^\lambda$, the verification key is vk, and a signature key is sk. Parameters generally used in the quantum-resistant signature system 10 according to the present disclosure include n, l, q, p, Ds, B, d, h, $L_s$, and $L_E$, and the parameters belong to the same category as parameters used in an existing ring-LWR method. That is, n, I, B, h, and d, and moduli q and p are positive integers, and I is equal or greater than 1 and equal to or less than n/2. Also, each of q and p is a power of 2, and p is less than q. Also, n is a product of a power of 2 and a power of 3.

The cyclotomic equation used in the key generation unit 110 includes three terms.

$$x^n - x^{n/2} + 1 \quad [\text{Equation 4}]$$

Equation 4 shows an example of the cyclotomic equation used in the key generation unit 110. Equation 4 that is a trinomial having three terms. According to the present disclosure, because a cyclotomic equation including three terms is as modular arithmetic of a ring, a high degree of freedom in selecting an index n is ensured and an error propagation rate is relatively low. Also, when Equation 4 is used as the cyclotomic equation, it is sufficient that n is a product of a power 2 and a power of 3 in order to increase a security strength. For example, in the present disclosure, when Equation 4 is adopted as the cyclotomic equation, n may be 512, 648, 768, 864, 972, or 1024.

The key generation unit 110 randomly selects a polynomial a in $R_q$ and selects a polynomial s in a distribution $D_s$, in calculation of the cyclotomic trinomial $R_q$ refers to a ring by the cyclotomic equation, and the ring is a set of polynomials having a preset coefficient in which addition and multiplication between elements are defined and refers to a set closed under addition and multiplication. For example, the ring generated by the cyclotomic equation $x^n - x^{n/2} + 1$ including three terms is $Z_q[X]/(x^n - x^{n/2} + 1)$.

Also, the key generation unit 110 calculates a polynomial t, and the polynomial t may be calculated through Equation 5.

$$t = \left[\frac{p}{q}(a \cdot s)\right] \quad [\text{Equation 5}]$$

When the polynomials a, s, and t are determined, the key generation unit 110 outputs the verification key vk and the signature key sk, and the output verification key and the signature key are determined by Equation 6 and Equation 7.

$$vk=(a,t) \quad [\text{Equation 6}]$$

$$sk=s \quad [\text{Equation 7}]$$

The signature value output unit 130 outputs a signature value based on the signature key output from the key generation unit 110.

For example, the signature value output unit 130 receives the signature key sk and a message M as an input, and outputs a signature value (z, c). The signature value output unit 130 randomly selects a polynomial y in $D_y$=[−B, B], and calculates v by using Equation 8.

$$v = a \cdot y (\mathrm{mod}\ q) \quad [\text{Equation 8}]$$

The signature value output unit 130 calculates vtrun by inputting the v calculated through Equation 8 into a truncate function. The truncate function is a function of selectively extracting only coefficients of terms selected under a preset condition, and is applied to reduce an error propagation rate of the ring generated by the cyclotomic equation including three terms.

When a quantum-resistant signal method is implemented based on ring-LWR as in the present disclosure, system parameters may be efficiently set as described above. However, as a multiplication operation is repeatedly performed as in Equation 5 or Equation 8, an error propagation rate is increased. Accordingly, when a truncate function is applied, an error propagation rate is also appropriately reduced.

The truncate function may selectively extract only coefficients of I terms having degrees equal to or less $$\frac{n}{2} - 1$$

than from among coefficients of input equations, and through the operation of the truncate function, an error propagation rate of the trinomial $x^n - x^{n/2} + 1$ is the lowest, and thus, a size of an error in the ring operation is efficiently limited.

An example where the truncate function operates is as follows.

First, the truncate function receives, as an input value, a polynomial $a=a_0+a_1X+\ldots+a_{n-1}X^{n-1}$ and an integer I that is equal to or less than n/2. Next, the truncate function extracts a set of coefficients $a_{n/2-l}, a_{n/2-l+1} \ldots, a_{n/2-1}$ from the polynomial a, generates a polynomial from the extracted coefficients, and outputs the polynomial. Equation 9 shows an example of the polynomial extracted by the truncate function.

$$Trun(a, l) = a_{\frac{n}{2}-l}x^{\frac{n}{2}-l} + a_{\frac{n}{2}-l+1}x^{\frac{n}{2}-l+1} + \cdots + a_{\frac{n}{2}-1}x^{\frac{n}{2}-1} \quad \text{[Equation 9]}$$

Alternatively, the signature value output unit 130 may control the truncate function to be performed in a separate module that is the function operation unit 170. The function operation unit 170 may receive the polynomial a and the integer I from the signature value output unit 130, may perform the function, and may return a result value to the signature value output unit 130.

Hereinafter, the signature value output unit 130 will be described.

The signature value output unit 130 calculates a signature value c by inputting $v_{trun}$, which is an operation result of the truncate function, along with a parameter m into a hash function.

$$c = H([v_{trun}]_d, m) \quad \text{[Equation 10]}$$

Equation 10 shows an example of an equation used by the signature value output unit 130 to calculate the signature value c. In order to derive a desirable result, $[v_{trun}]_d$ that is a result of cutting lowest d bits from $v_{trun}$ that is the operation result of the truncate function is input into the hash function, and the value d is one of system parameters as described with respect to the key generation unit 110.

When c is calculated, the signature value output unit 130 calculates z through Equation 11, and when a condition according to Equation 12 is satisfied, the signature value output unit 130 initializes all operations, and controls to start anew from a process of outputting the verification key and the signature key from the key generation unit 110.

$$z = y + s \cdot c \quad \text{[Equation 11]}$$

$$\|[z]\|_\infty > B - L_s \quad \text{[Equation 13]}$$

When the condition according to Equation 12 is not satisfied, the signature value output unit 130 calculates w through Equation 13.

$$w = a \cdot z - \frac{q}{p}(t \cdot c)(\bmod q) \quad \text{[Equation 13]}$$

Equation 13 is an equation for calculating w, and a, z, p, q, t, c, and q in Equation 13 are pre-determined as system parameters or are calculated through a previous calculation process as described above.

When w is calculated, the signature value output unit 130 calls the truncate function again, inputs the calculated w along with the integer I, and calculates $w_{trun}$. When a condition according to Equation 14 or Equation 15 is satisfied, the signature value output unit 130 initializes all operations, and controls to start anew from a process of outputting the verification key and the signature key from the key generation unit 110.

$$\|[w]_{2^d}\|_\infty > 2^{d-1} - L_E \quad \text{[Equation 14]}$$

$$[w_{trun}]_d \neq [v_{trun}]_d \quad \text{[Equation 15]}$$

When the conditions according to Equation 14 and Equation 15 are not satisfied, the signature value output unit 130 outputs a signature value (z, c).

The signature verification unit 150 calculates an operation value based on the verification key vk output from the key generation unit 110 and the signature value (z, c) output from the signature value output unit 130, and verifies a signature based on a result of comparing the signature value with the operation value.

In detail, the signature verification unit 150 calculates w' through Equation 16, and calculates $w_{trun}$ by inputting the calculated w' to the truncate function. In this process, the signature verification unit 150 transmits the polynomial and the integer I to the function operation unit 170, like the signature value output unit 130, and may receive a result value obtained by calculating the truncate function.

$$w' = \alpha \cdot z - \frac{q}{p}(t \cdot c)(\bmod q) \quad \text{[Equation 1]}$$

Because Equation 16 is similar in form to Equation 13, Equation 13 is an equation used in a signature step, and Equation 16 is an equation used in a signature verification step, when a correct signature is input, Equation 16 and Equation 13 are the substantially the same.

Next, the signature verification unit 150 calculates c' by inputting the calculated $w_{trun}$ and m into the hash function as in Equation 10, and verifies a signature by comparing the signature value c with the operation value c'. When the signature value c and the operation value c' are the same and a condition according to Equation 17 is satisfied, the signature verification unit 150 considers that the signature is verified.

$$\|z\|_\infty > B - L_s \quad \text{[Equation 17]}$$

In contrast, when the condition according to Equation 17 is not satisfied, the signature verification unit 150 considers that the signature is not verified, regardless of whether the signature value c and the operation value c' are the same. B in Equation 17 is a largest value in a range in which a polynomial y may be selected in the signature process, and $L_s$ is a value determined as a system parameter as described above.

The function operation unit 170 receives the polynomial and the integer from the signature value output unit 130 and the signature verification unit 150, performs the truncate operation, and returns a result to the signature value output unit 130 or the signature verification unit 150. Because the function operation unit 170 is a module for performing a truncate operation, according to an embodiment, the function operation unit 170 may be included in each of the signature value output unit 130 and the signature verification unit 150, unlike in FIG. 1.

Figure 2:
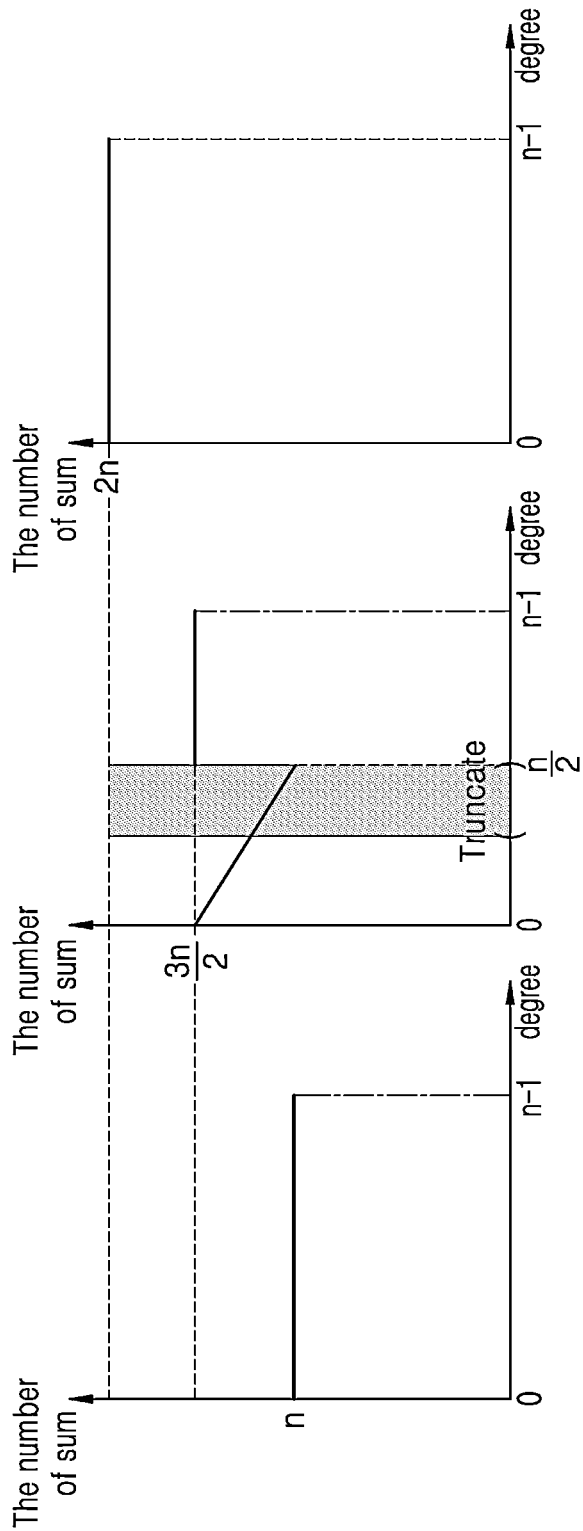
FIG. 2 is a diagram illustrating a correlation between an error propagation rate according to a cyclotomic equation and a truncate function operation applied in the present disclosure.

FIG. 2 is a diagram illustrating a correlation between an error propagation rate according to a cyclotomic equation and a truncate function operation applied in the present disclosure.

In more detail, in FIG. 2, three graphs are compared on the same line. A system may have the same error propagation rate as any one of the three graphs of FIG. 2 according to how a cyclotomic equation is set.

First, the leftmost graph of FIG. 2 shows an error propagation rate when a cyclotomic equation is set to $x^n+1$ and a ring-LWE-based quantum-resistant method is implemented. Referring to FIG. 2, in the leftmost graph, it is found that the number of sum is fixed to n over a degree range of 0 to n−1.

Next, the rightmost graph of FIG. 2 shows an error propagation rate when a cyclotomic equation is set to $x^n+x^{n-1}+\ldots+1$ and a ring-LWE-based quantum-resistant signature method is implemented. Referring to FIG. 2, in the rightmost graph, it is found that the number of sum is fixed to 2n over a degree range from 0 to n-1, and as described in the background art, when the cyclotomic equation is set to $x^n+x^{n-1}+\ldots+1$, a degree of freedom in selecting an index is increased but an error propagation rate is 2n.

Last, the graph at the center of FIG. 2 shows an error propagation rate when a cyclotomic equation is set to a trinomial and a ring-LWR-based quantum-resistant signature method is implemented.

Referring to FIG. 2, in the graph at the center, an error propagation rate when a degree is 0 is 3n/2 which is higher than that of the leftmost graph, but gradually decreases as the degree increases. In the present disclosure, an error propagation rate is remarkably reduced by additionally adopting a configuration for extracting only a part whose error propagation rate is much lower than 3n/2 by applying a truncate function in a step of outputting a signature value and verifying a signature.

Figure 3:
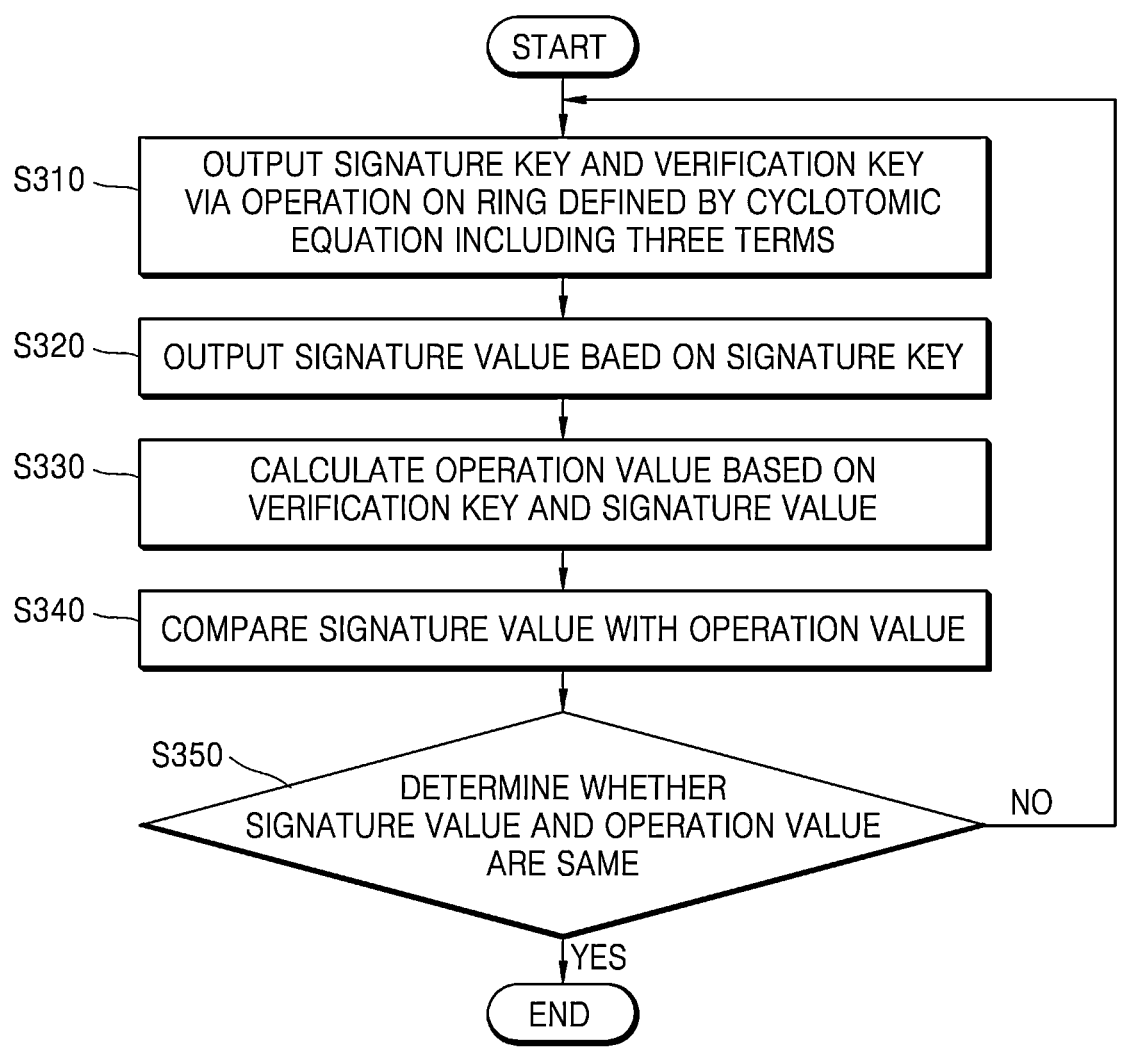
FIG. 3 is a flowchart illustrating a quantum-resistant signature method, according to an embodiment of the present disclosure.

FIG. 3 is a flowchart illustrating a quantum-resistant signature method, according to an embodiment of the present disclosure.

The quantum-resistant signature method of FIG. 3 may be implemented by the quantum-resistant signature system 10 of FIG. 1, and thus, the same description as that made with reference to FIG. 1 will be omitted.

The key generation unit 110 outputs a signature key and a verification key via an operation on a ring defined by a cyclotomic equation including three terms (S310).

The signature value output unit 130 outputs a signature value based on the signature key (S320).

The signature verification unit 150 calculates an operation value based on the verification key and the signature value (S330).

The signature verification unit 150 compares the signature value with the operation value to determine whether the signature value and the operation value are the same (S340), and when it is determined that the signature value and the operation value are the same, the signature verification unit 150 may determine that a signal is a normal signature, and when it is determined that the signature value and the operation value are not the same, the signature verification unit 150 may determine that a signature is not a normal signature (S350).

In an embodiment, in operation S350, even when the signature value and the operation value are the same, when a condition according to Equation 17 is not satisfied, signature verification unit 150 may determine that a signature is not a normal signature as described above.

According to the present disclosure, system parameters including a signature value may be efficiently set for various security strengths.

Also, according to the present disclosure, because a special function for reducing an error propagation error in a polynomial multiplication operation defined in a ring is adopted, entire system efficiency including an algorithm implementation speed is significantly improved. In particular, according to the present disclosure, an error range may be strictly set by applying a truncate function, and the number of repetitions performed in a signature generation algorithm may be reduced.

Also, according to the present disclosure, because a signature structure designed based on existing ring-LWE is designed based on ring-LWR, a size of a secret key may be halved and a size of a public key may also be reduced from $Z_q$ to $Z_p$ 1 and because a process of generating a secret key in a Gaussian distribution in a key generation process may be omitted, a key generation speed may be increased and the risk of a side-channel attack may be reduced.

The embodiments of the present disclosure may be implemented as computer programs executable through various components on a computer, and the computer programs may be stored in a computer-readable medium. Examples of the medium may include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program instructions such as a ROM, a random-access memory (RAM), or a flash memory.

The computer programs may be specially designed and configured for the present disclosure or may be well-known to and be usable by one of ordinary skill in the art of computer software. Examples of the program programs may include advanced language codes that may be executed by a computer by using an interpreter or the like as well as machine language code made by a compiler.

Specific execution methods described in the present disclosure are examples, and a technical scope of the present disclosure is not limited by any method. For the sake of brevity, conventional electronics, control systems, software, and other functional aspects of the systems may not be described in detail. Also, lines or members connecting elements illustrated in the drawings are merely illustrative of functional connections and/or physical or circuit connections. In an actual device, the connections between elements may be represented by various functional connections, physical connections, or circuit connections that are replaceable or added. Moreover, no item or component is essential to the practice of the present disclosure unless the item or component is specifically described as "essential" or "critical".

The use of the terms "a" and "an," and "the" and similar referents in the context of describing the present disclosure (especially in the context of the following claims) is to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein may be performed in any suitable order unless otherwise indicated herein or otherwise clearly contradicted by context. The present disclosure is not limited to the order of the operations described. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. It will be understood by one of ordinary skill in the art that numerous modifications, adaptations, and changes will be made according to design conditions and factors without departing from the spirit and scope of the appended claims.

The invention claimed is:

1. A ring-learning with rounding (LWR)-based quantum-resistant signature method comprising:
a key generation step of receiving a security parameter, and outputting a signature key and a verification key, via an operation on a ring defined by a cyclotomic equation comprising three terms;
a signature value output step of outputting a signature value based on the output signature key; and
a signature verification step of calculating an operation value based on the output verification key and signature value, and verifying a signature based on a result of comparing the output signature value with the calculated operation value,
wherein a degree n of a leading term of the cyclotomic equation is a product of a power of 2 and a power of 3.

2. The ring-LWR-based quantum-resistant signature method of claim 1, wherein the signature value output step comprises outputting the signature value, by applying a truncate function of selectively extracting only coefficients of terms selected under a preset condition.

3. The ring-LWR-based quantum-resistant signature method of claim 1, wherein the signature verification step comprises calculating the operation value, by applying a truncate function of selectively extracting only coefficients of terms selected under a preset condition.

4. A non-transitory computer-readable medium storing a computer program including instructions that, when executed by a processor, causes a computer to execute the instructions comprising:
receiving a security parameter, and outputting a signature key and a verification key, via an operation on a ring defined by a cyclotomic equation comprising three terms;
outputting a signature value based on the output signature key; and
calculating an operation value based on the output verification key and signature value, and verifying a signature based on a result of comparing the output signature value with the calculated operation value,
wherein a degree n of a leading term of the cyclotomic equation is a product of a power of 2 and a power of 3.

5. A ring-learning with rounding (LWR)-based quantum-resistant signature method comprising:
a key generation step of receiving a security parameter, and outputting a signature key and a verification key, via an operation on a ring defined by a cyclotomic equation comprising three terms;
a signature value output step of outputting a signature value based on the output signature key; and
a signature verification step of calculating an operation value based on the output verification key and signature value, and verifying a signature based on a result of comparing the output signature value with the calculated operation value,
wherein the signature value output step comprises outputting the signature value, by applying a truncate function of selectively extracting only coefficients of terms selected under a preset condition.

6. The ring-LWR-based quantum-resistant signature method of claim 5, wherein the signature verification step comprises calculating the operation value, by applying a truncate function of selectively extracting only coefficients of terms selected under a preset condition.

7. A ring-learning with rounding (LWR)-based quantum-resistant signature method comprising:
a key generation step of receiving a security parameter, and outputting a signature key and a verification key, via an operation on a ring defined by a cyclotomic equation comprising three terms;
a signature value output step of outputting a signature value based on the output signature key; and
a signature verification step of calculating an operation value based on the output verification key and signature value, and verifying a signature based on a result of comparing the output signature value with the calculated operation value,
wherein the signature verification step comprises calculating the operation value, by applying a truncate function of selectively extracting only coefficients of terms selected under a preset condition.

\* \* \* \* \*